(12) United States Patent
Migita et al.

(10) Patent No.: US 7,373,711 B2
(45) Date of Patent: May 20, 2008

(54) MOTOR ARMATURE MANUFACTURING METHOD

(75) Inventors: Takayuki Migita, Kyoto (JP); Hiroaki Suzuki, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/691,498

(22) Filed: Mar. 27, 2007

(65) Prior Publication Data

US 2007/0188039 A1   Aug. 16, 2007

Related U.S. Application Data

(62) Division of application No. 11/163,733, filed on Oct. 28, 2005, now Pat. No. 7,211,918.

(30) Foreign Application Priority Data

Oct. 28, 2004   (JP) ............................. 2004-313376

(51) Int. Cl.
*H02K 15/02* (2006.01)
*H02K 15/14* (2006.01)

(52) U.S. Cl. ...................... 29/596; 29/598; 310/215

(58) Field of Classification Search ........ 310/214–218; 29/596–598, 606
See application file for complete search history.

(56) References Cited

U.S. PATENT DOCUMENTS

| | | | | |
|---|---|---|---|---|
| 3,562,570 A | * | 2/1971 | Frank ......................... | 310/234 |
| 4,247,978 A | * | 2/1981 | Smith ......................... | 29/596 |
| 4,719,377 A | * | 1/1988 | Horie et al. ................. | 310/44 |
| 4,788,761 A | * | 12/1988 | Crawford et al. ............. | 29/596 |
| 4,818,911 A | * | 4/1989 | Taguchi et al. ............. | 310/259 |
| 5,969,455 A | * | 10/1999 | Sakamoto .................... | 310/194 |
| 6,225,725 B1 | * | 5/2001 | Itoh et al. ................... | 310/254 |
| 6,335,582 B1 | * | 1/2002 | Abukawa et al. ........... | 310/214 |
| 6,580,193 B2 | * | 6/2003 | Yoshikawa et al. ......... | 310/215 |
| 7,146,706 B2 | * | 12/2006 | Du et al. ..................... | 29/596 |

FOREIGN PATENT DOCUMENTS

| | | | | |
|---|---|---|---|---|
| EP | 20011286085 | * | 10/2001 | ................. 310/215 |
| JP | 1248948 | * | 10/1989 | ................. 310/218 |
| JP | 2004242384 | * | 8/2004 | ................. 310/218 |

* cited by examiner

*Primary Examiner*—Tran Nguyen
(74) *Attorney, Agent, or Firm*—Keating & Bennett, LLP

(57) ABSTRACT

An insulator covering the teeth (31) of an armature (3) in an inner-rotor motor is composed of a tooth insulator (321), outer-side insulator (322), upper-end insulator (323), and lower-end insulator (324). The tooth insulator (321) is composed of substantially annular top and bottom members that are assembled from above and below to the teeth (31).

6 Claims, 20 Drawing Sheets

MOTOR ARMATURE MANUFACTURING METHOD

BACKGROUND OF THE INVENTION

1. Technical Field

The present invention relates to methods of manufacturing the armature for inner-rotor electric motors.

2. Description of the Related Art

The armature in an inner-rotor motor is provided with a plurality of teeth that, directed inward, protrude from the inner circumferential surface of a cylindrical core back, and a conductor is wound onto, electrically isolated from, the teeth to form the coils. Known methods of forming the coils include a technique in which winding is carried out by inserting the needle of a winding machine into narrow, groove-like slots between the teeth, and a technique in which a specialized inserter is employed to insert the teeth into conductor wire that has been wound into a special coil form in advance.

In an inner-rotor motor, however, the slots between the teeth open into the confined space along the center shaft, and forming the coil is thus not easy. This makes it difficult to achieve a sufficiently high slot-fill factor. It is also desirable, however, to minimize the gap between the teeth in order to reduce the cogging torque of the motor.

As conventional art for solving the foregoing problem is a technology in which a core member is constituted from a tooth module unitarily formed by circularly joining the inner circumferential edges of a plurality of teeth disposed in a radial fashion, and a core back portion that is separably attached to the outer periphery of the tooth module, and in which a conductor is wound onto each of the teeth, which each have been fitted with an insulating component before the core back portion is attached to the tooth module.

In other conventional art, meanwhile, is a technology in which a stator is manufactured by partially joining with a linker the inner circumferential edges of a radially arranged plurality of teeth and providing insulating components on each tooth, then winding a conductor around and attaching a core back portion onto the linked and insulator-outfitted teeth, and afterwards taking off the linker.

A problem with the foregoing armature is that there are no insulating components with which the armature can be easily manufactured without impairing the electrical isolation between the conductor and the core (the teeth and core back). In addition, for armatures in the conventional technologies, mention has yet to be made regarding the configuration of the insulating components in distributed winding implementations.

When forming coils by winding the conductor onto the teeth in armatures of this sort, the coil may protrude above and below from the top and bottom ends of the teeth. In particular, when the coils are formed by distributed windings, in which the conductor is wound straddling a plurality of teeth, the amount by which the coils protrude is considerable, compared with concentrated windings, in which the conductor is wrapped onto each tooth individually. The protruding coils can be reformed as required, but doing so runs the risk that the reformed coils will come into contact with the top or bottom surfaces of the core back, which is not provided with an insulator.

BRIEF SUMMARY OF THE INVENTION

The present invention enables easily and reliably electrically isolating the coil from the core in an inner-rotor motor.

A method of manufacturing an armature of the present invention comprises steps of: attaching to a plurality of teeth whose fore edges have been temporarily joined together by a linking member top and bottom members over the top and bottom of the plurality of teeth axially; and forming coils by winding conductors onto the plurality of teeth, around the perimeter of the top and bottom members.

In addition, the foregoing method further comprises: a step of installing in an interdigitated fashion between the plural teeth outer-side insulators for covering between the teeth the exterior side of the coils, and attaching to the plurality of teeth a support ring for supporting the plurality of teeth along their outer side; and a step of removing the linking member linking the fore edges of the plural teeth.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

Referring now to the attached drawings which form a part of this original disclosure.

DETAILED DESCRIPTION OF THE INVENTION

Figure 1:
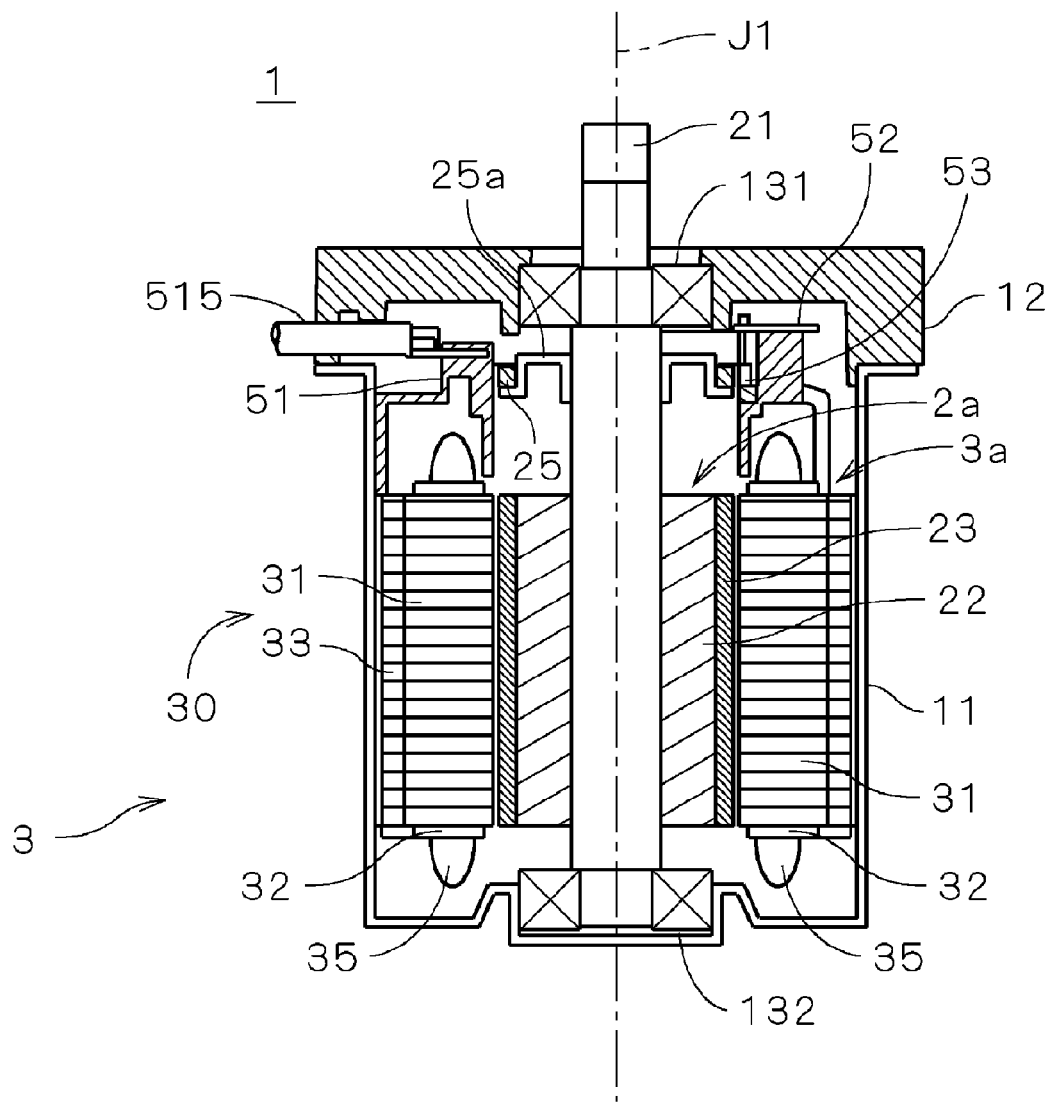
FIG. 1 is a vertical section view of a motor.

FIG. 1 is a vertical section view of an electric motor 1 with an inner rotor according to a preferred embodiment of the invention. Note that when the relative positions and orientations (directions) of the various parts are described below with reference to top, bottom, right, and left, these directional references are based on the relative positions and directions as presented in the accompanying figures, and do not necessarily denote the relative positions and directions in an actual product.

The electric motor 1 is a brushless motor that is used, for example, as the drive power source for power steering in an automobile. (It should be noted that hatching is omitted from the finely detailed portions of the section view.) The electric motor 1 is covered by a cylindrical housing 11 of which the top end as seen in FIG. 1 is open, and a cover 12 that has an opening in the center and covers the opening in the housing 11. Ball bearings 131, 132 are provided in the opening of the cover 12 and the bottom of the housing 11. The ball bearings 131, 132 support the shaft 21 while allowing it to rotate.

A columnar rotor yoke 22 made from a magnetic material is mounted on the shaft 21 inside the housing 11. A multipole field magnet 23 is affixed to the outside surface of the rotor yoke 22. A sintered body containing neodymium, for example, is used for the field magnet 23. On the other hand, an armature 3 is attached to the inner circumferential surface of the housing 11, opposing the field magnet 23.

The armature 3 is disposed with the center axis J1 of the armature 3 coaxial with the shaft 21. The armature 3 has a laminated core 30 made of magnetic silicon steel plates. This core 30 has a plurality of teeth 31 extending from the inner circumferential surface of the housing 11 in the direction toward the shaft 21 and field magnet 23. The plurality of teeth 31 is furnished with a support ring 33 for supporting the plural teeth 31 along their outer side.

Figure 2:
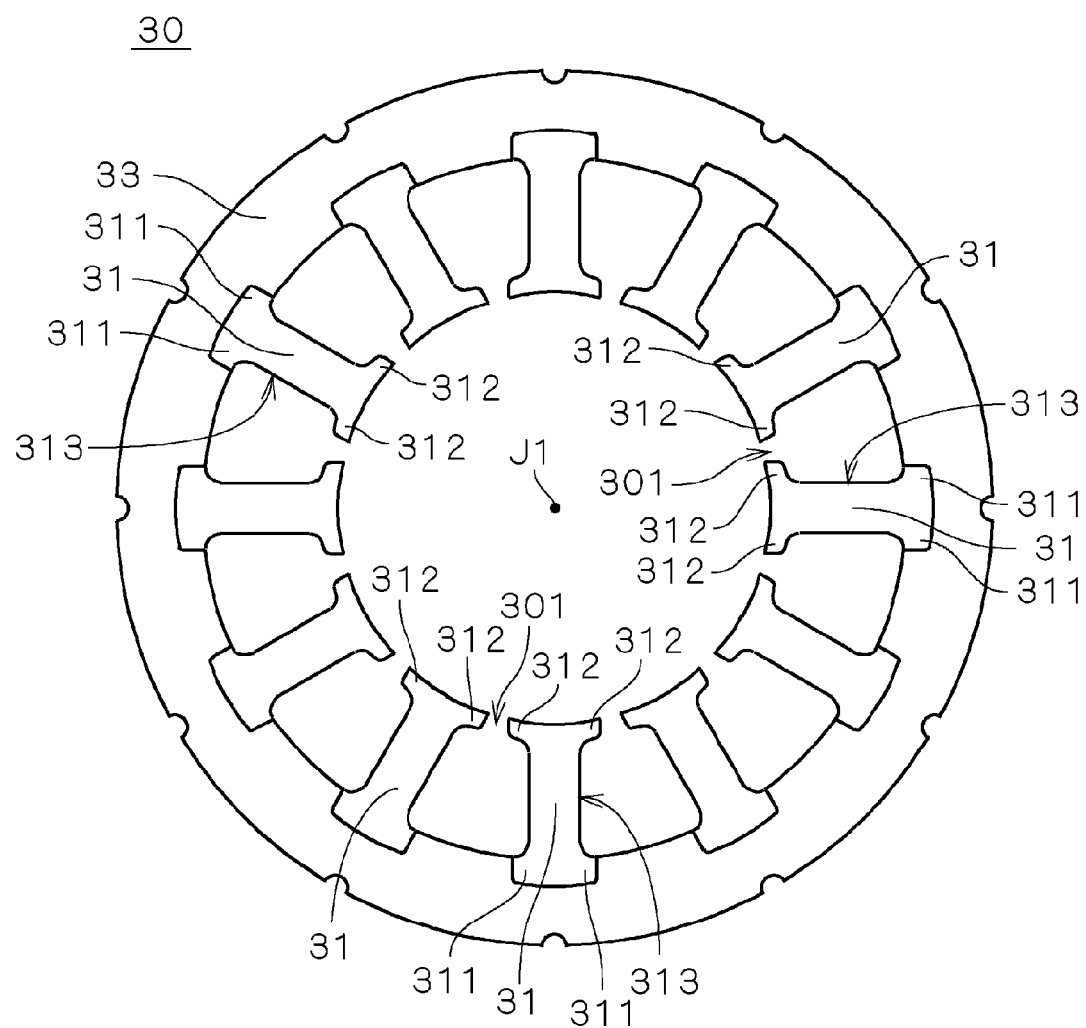
FIG. 2 is a plan view of a core.

FIG. 2 is a plan view illustrating the core 30. As shown in FIG. 2, the plural (specifically twelve in this embodiment of the invention) teeth 31 are arranged in a radial pattern centered on the center axis J1, with one fore edge of each tooth 31 directed toward the center axis J1. Each tooth 31 has, in region thereof along the support ring 33 (that is, the distal portion on the side opposite the center axis J1 side) a first protruding portion 311 that bulges in either direction along a circumference centered on center axis J1. This first protruding part 311 fits into a recess provided in the inner circumferential surface of the support ring 33. Each tooth 31 also has, in the distal portion on center axis J1 side, a second protruding part 312 protruding in either direction along a circumference centered on center axis J1. The space between adjacent second protruding parts 312 is a gap 301 (called an "open slot" below) that is vertically (along the center axis J1) elongate.

As shown in FIG. 1 the armature 3 is also furnished with an insulator 32 that covers the plural teeth 31. The armature 3 is further furnished with coils 35 that are provided by winding the plural teeth 31 with a conductor into multiple layers from the top of the insulator 32. The coil 35 is formed by winding the conductor vertically around the outside of the teeth 31 and insulator 32. Herein, the insulator 32 involving this embodiment of the invention is a cast resin article, and is composed of a tooth insulator, an outer-side insulator, an upper-end insulator, and a lower-end insulator as further described below.

A busbar 51 fitted with connectors for supplying drive current to the coil 35 of the armature 3 is disposed on the cover 12 side of the armature 3 with respect to the orientation in which the center axis J1 extends. This busbar 51 is formed by laminating four arc-shaped conductor plates in the orientation in which the center axis J1 extends, and is packaged in resin so that the terminals protruding from each conducting plate are exteriorly exposed. An externally leading wire 515, together with the conductor from each coil 35, is connected to each terminal. A detection circuit board 52 having Hall elements mounted thereon is attached to the cover 12 side of the busbar 51.

The rotor 2a of this electric motor 1 is composed of primarily rotor yoke 22 and field magnet 23. This electric motor 1 also has a stator 3a composed of primarily the armature 3, busbar 51, and detection circuit board 52 affixed inside the housing 11. The ball bearings 131, 132 function as a bearing mechanism supporting the rotor 2a so that the rotor 2a can rotate relative to the stator 3a around center axis J1. Supplying drive current through the busbar 51 to the armature 3 produces torque centered on center axis J1 between the armature 3 and field magnet 23, and the rotor 2a thus turns.

Three Hall elements 53 are mounted on the detection circuit board 52 projecting downward together with other electronic parts. These Hall elements 53 are held in a sensor holder. An annular magnet 25 for use as a sensor is attached to the shaft 21 by way of an intervening magnetic flange 25a on the cover 12 side of the field magnet 23. The sensor magnet 25 is opposite the Hall elements 53. Like the field magnet 23, the sensor magnet 25 is a laminated magnet. The position of the field magnet 23 can thus be indirectly detected as a result of the Hall elements 53 detecting the position of sensor magnet 25. Supplying drive current to the armature 3 can thus be controlled based on this detection result. The flange 25a covers the faces of the sensor magnet 25 opposite the field magnet 23 and armature 3, and can thus prevent interference with both fields.

Figure 3:
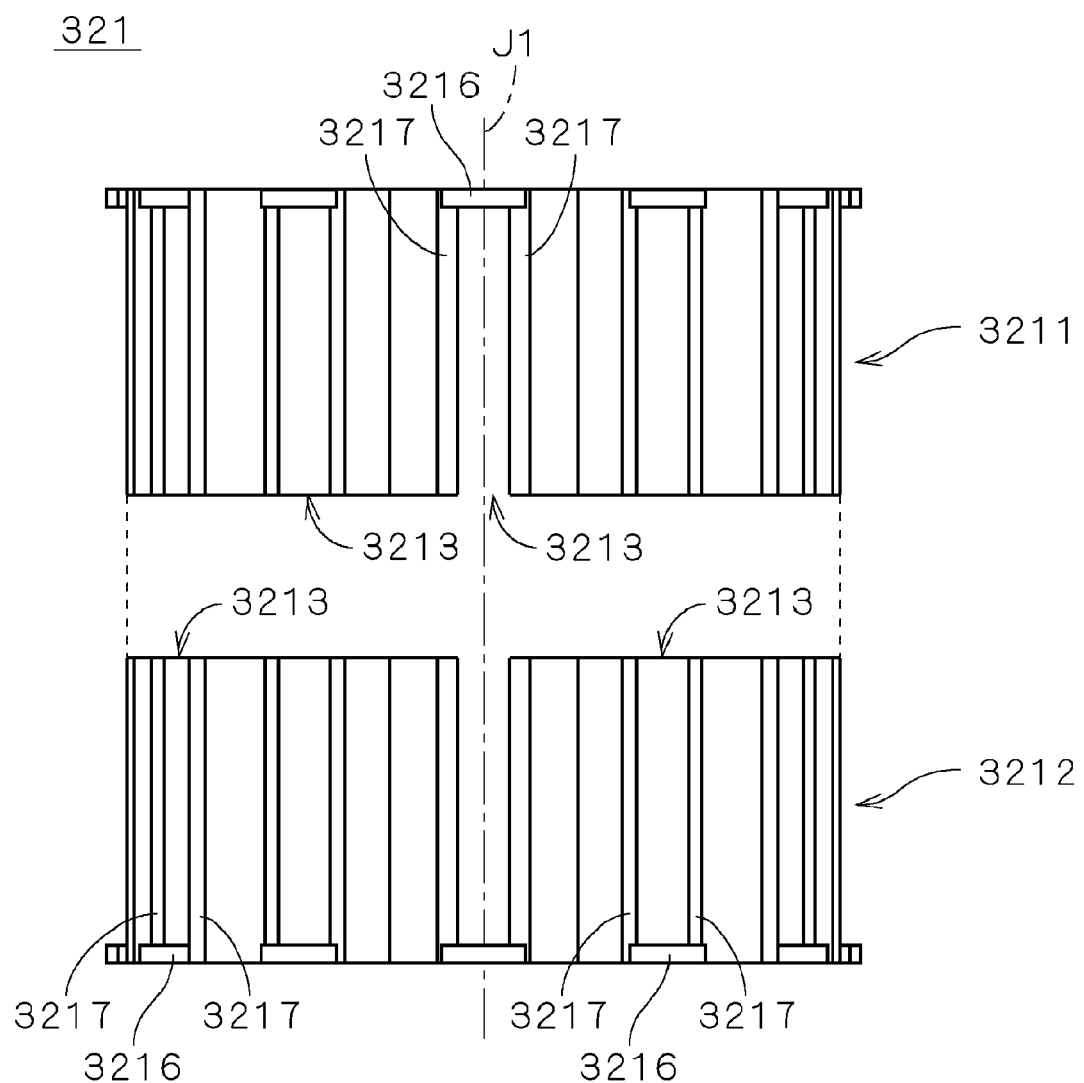
FIG. 3 is an exploded elevational view of a tooth insulator.

FIGS. 3 to 10 illustrate the parts that constitute the insulator 32. FIG. 3 is an exploded elevational view of a tooth insulator 321 that covers the surfaces 313 (see FIG. 2) of the plural teeth 31 around which the conductor is wound. There are four of these surfaces 313 on each tooth 31: the two faces perpendicular to the center axis J1, and the two faces perpendicular to the circumferential orientation centering on center axis J1. These surfaces will be referred to hereinafter as "tooth lateral sides." As shown in FIG. 3, the tooth insulator 321 is composed of a top member 3211 which is fit to the plural teeth 31 (see FIG. 1) from one side relative to the orientation in which the center axis J1 is directed (that is, the upper end), and a bottom member 3212 which is similarly fit to the plural teeth 31 from the other side (that is, the lower end). The top member 3211 and bottom member 3212 are identically shaped. The following description of the top member 3211 shown in FIG. 4 and FIG. 5 therefore also applies to the bottom member 3212.

Figure 4:
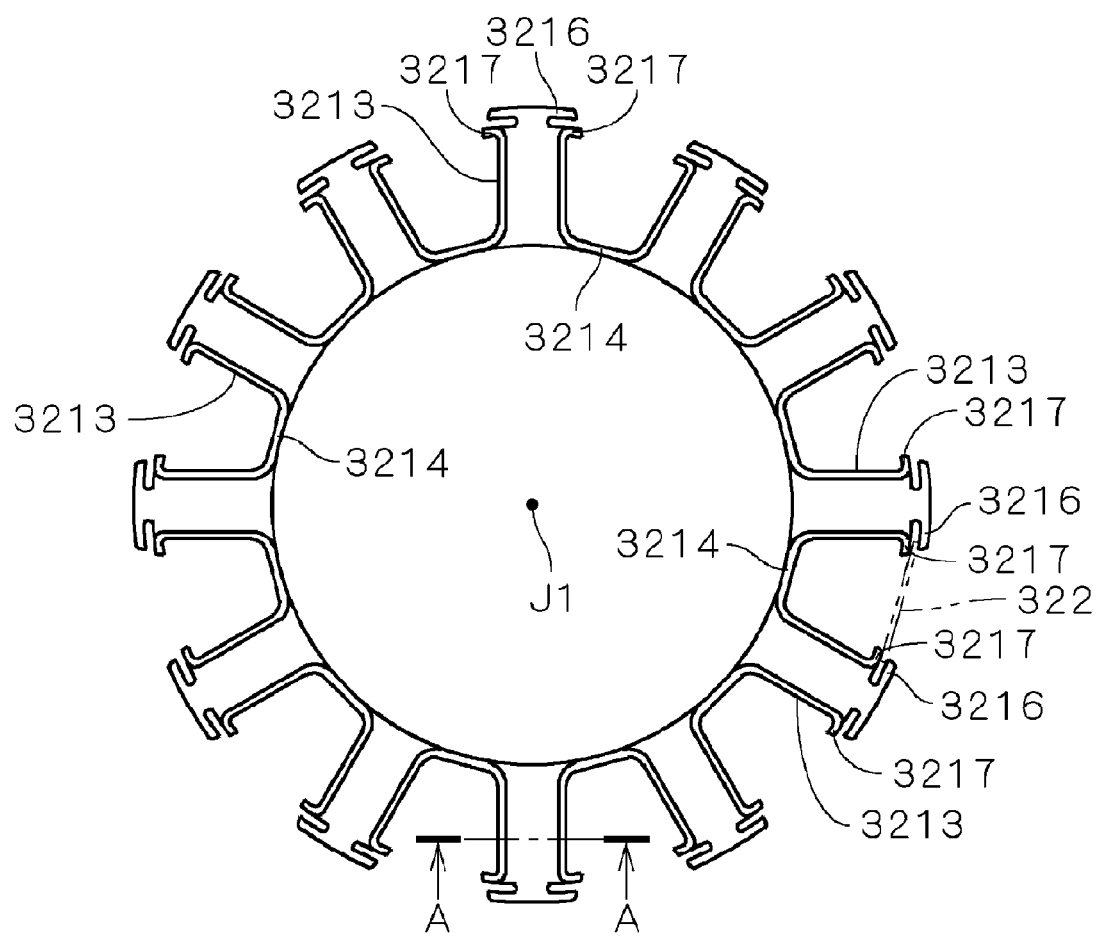
FIG. 4 is an underside view of a top member.

FIG. 4 is a bottom view of the top member 3211 of the tooth insulator 321 as seen from the bottom member 3212. As shown in FIG. 4 the top member 3211 has a plurality of side portions 3213 that cover the sides of each of the teeth 31 arranged radiating around center axis J1, and a plurality of connecting portions 3214 interconnecting adjacent side portions 3213 on the center axis J1 side. The side portions 3213 cover the top surface of the tooth and approximately the upper half of the two parallel faces descending from opposite sides of the top surface. As viewed from the center axis J1, the side portions 3213 have an upside-down U-shape as shown in FIG. 6.

Figure 5:
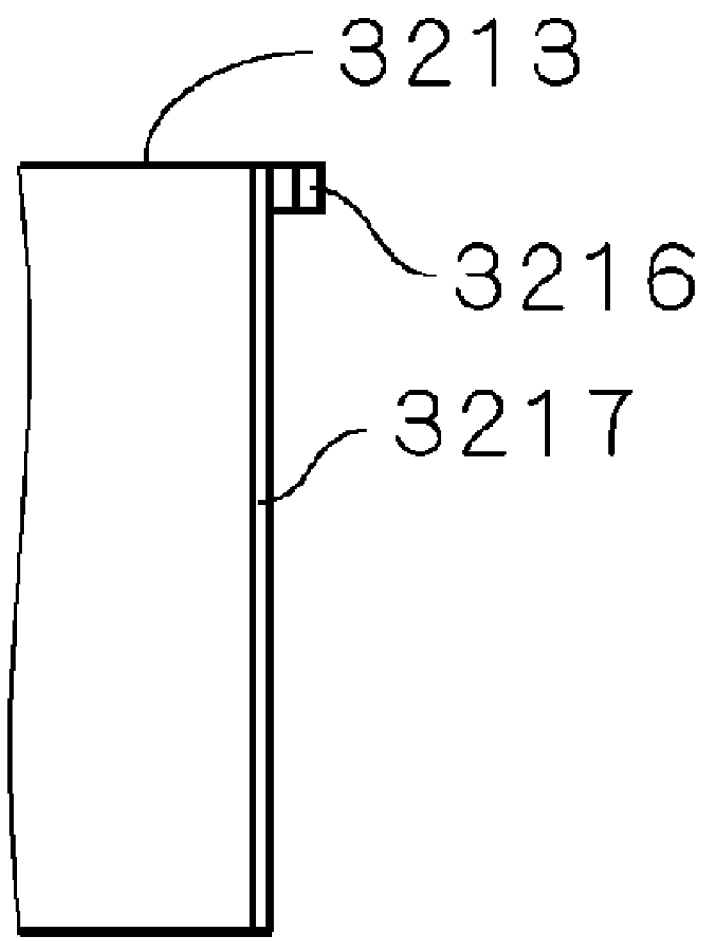
FIG. 5 is a fragmentary lateral view of a side member.

FIG. 5 is a side view of one side portion 3213 of the top member 3211. As shown in FIG. 3 to FIG. 5, a interlocking portion 3216 is rendered at the top end part of each side portion 3213 on the side opposite the side facing the center axis J1. Two rim portions 3217 extending vertically, and circumferentially centering on the center axis J1 are provided on the center-axis J1 side of the interlocking portion 3216.

Figure 6:
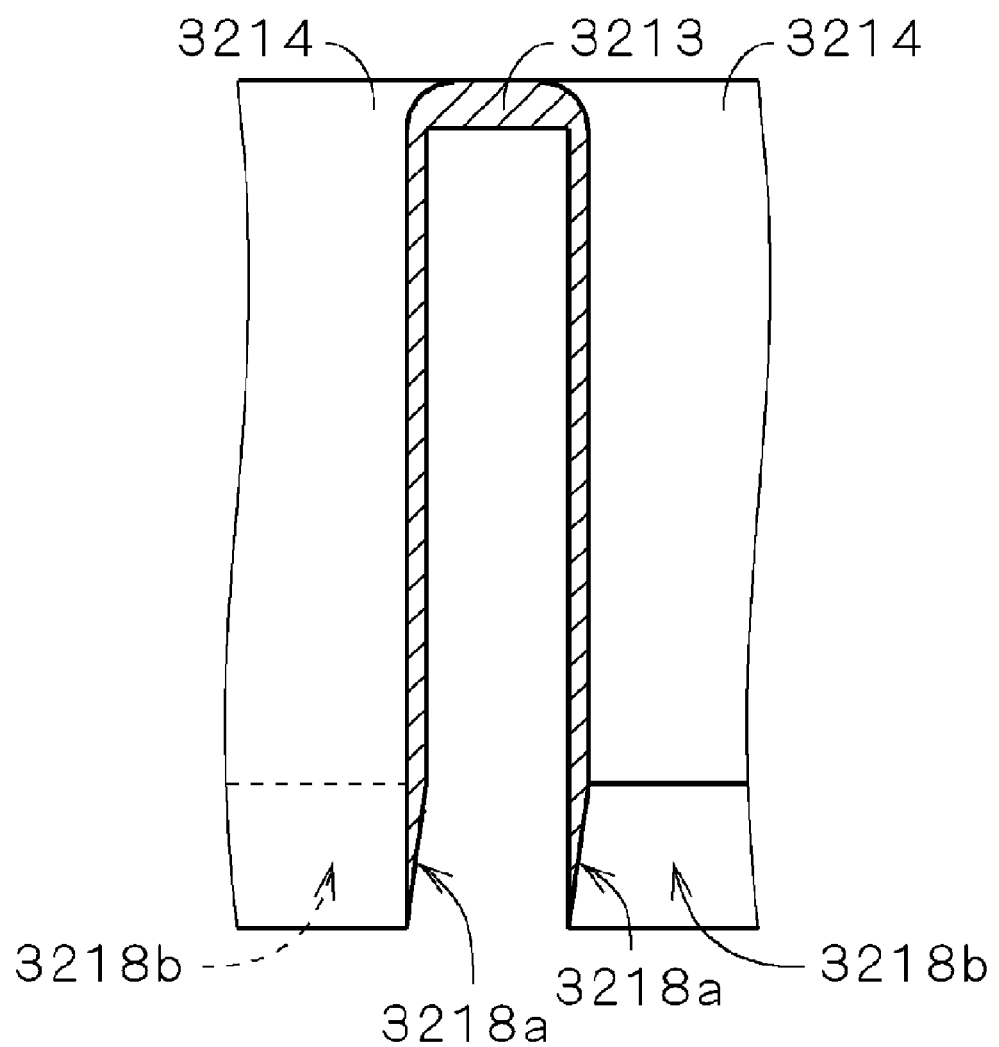
FIG. 6 is a partially sectional view fragmentarily depicting the top member.
Figure 7:
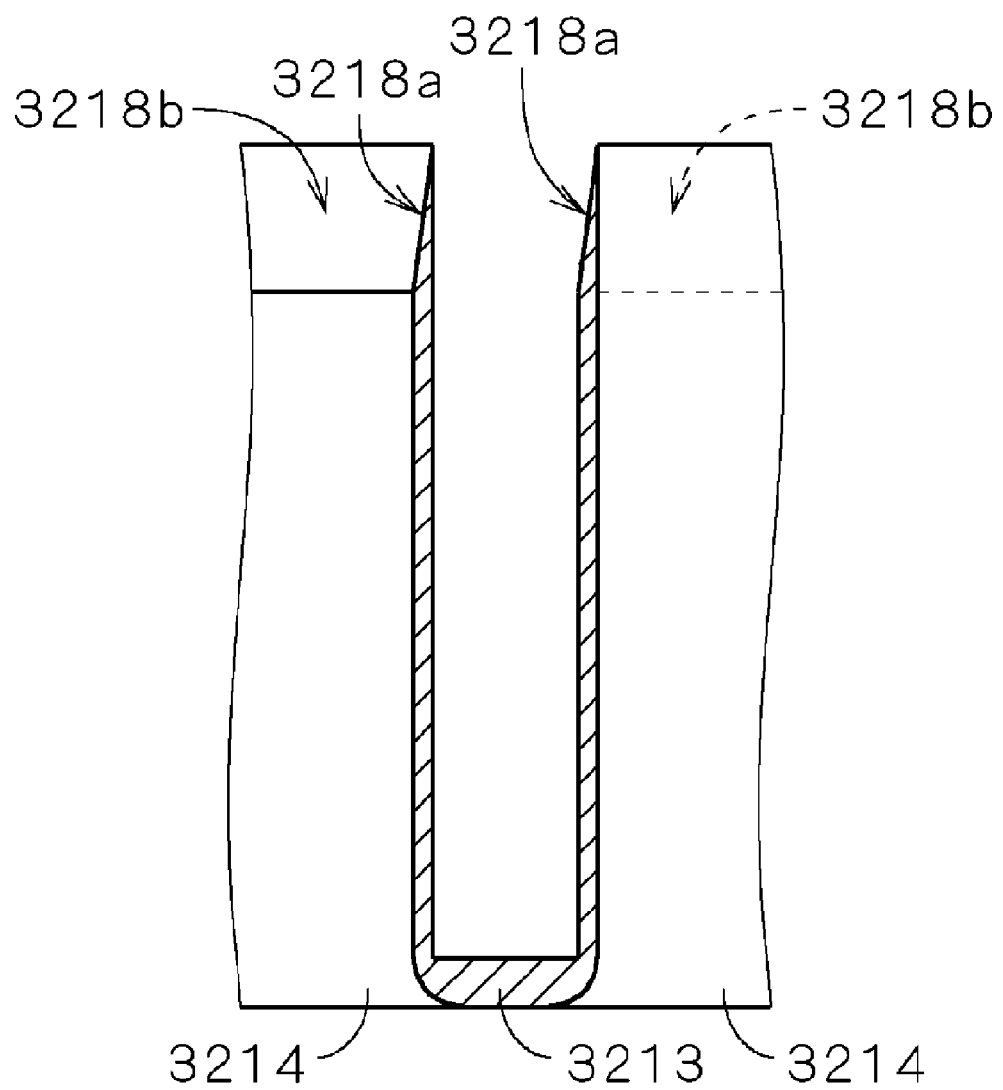
FIG. 7 is a partially sectional view fragmentarily depicting a bottom member.

FIG. 6 and FIG. 7 are partial section views showing part of the top member 3211 and bottom member 3212. The hatched portions in these figures indicate a section through line A-A in FIG. 4. As shown in FIG. 6 and FIG. 7, a tapered face 3218a, 3218b is rendered to side portions 3213 and connecting portions 3214 at the bottom end of the top member 3211 and the top end of the bottom member 3212. When the top member 3211 and bottom member 3212 are assembled facing each other as they are when assembled to the core 30, the tapered faces 3218b of adjacent connecting portions 3214 face in opposite directions. Though not shown in the figures, the tapered faces 3218a of adjacent side portions 3213 are also formed facing in opposite directions.

Figure 8:
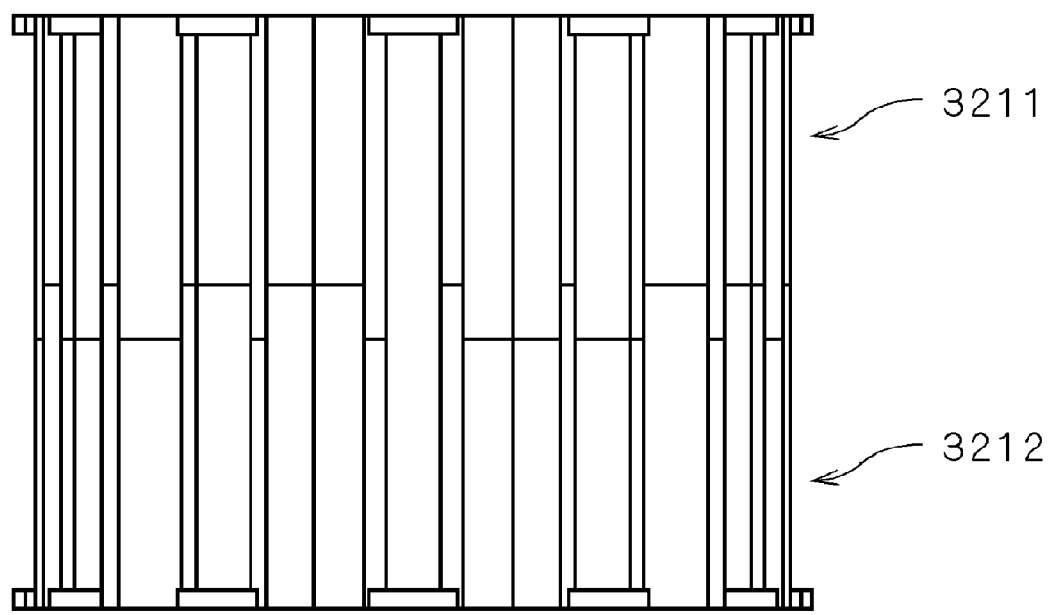
FIG. 8 is a view depicting the top member and bottom member.

FIG. 8 shows the top member 3211 and bottom member 3212 of the tooth insulator 321 assembled to the teeth 31, although the teeth 31 are not shown in the figure. As shown in FIG. 8 when the top member 3211 and bottom member 3212 are attached to the teeth 31, the tapered faces 3218a and 3218b overlap each other (see FIG. 6 and FIG. 7). A gap is thus prevented from forming between the top member 3211 and bottom member 3212. The tooth insulator 321 thus covers the teeth 31 without exposing the side surfaces 313.

Figure 9:
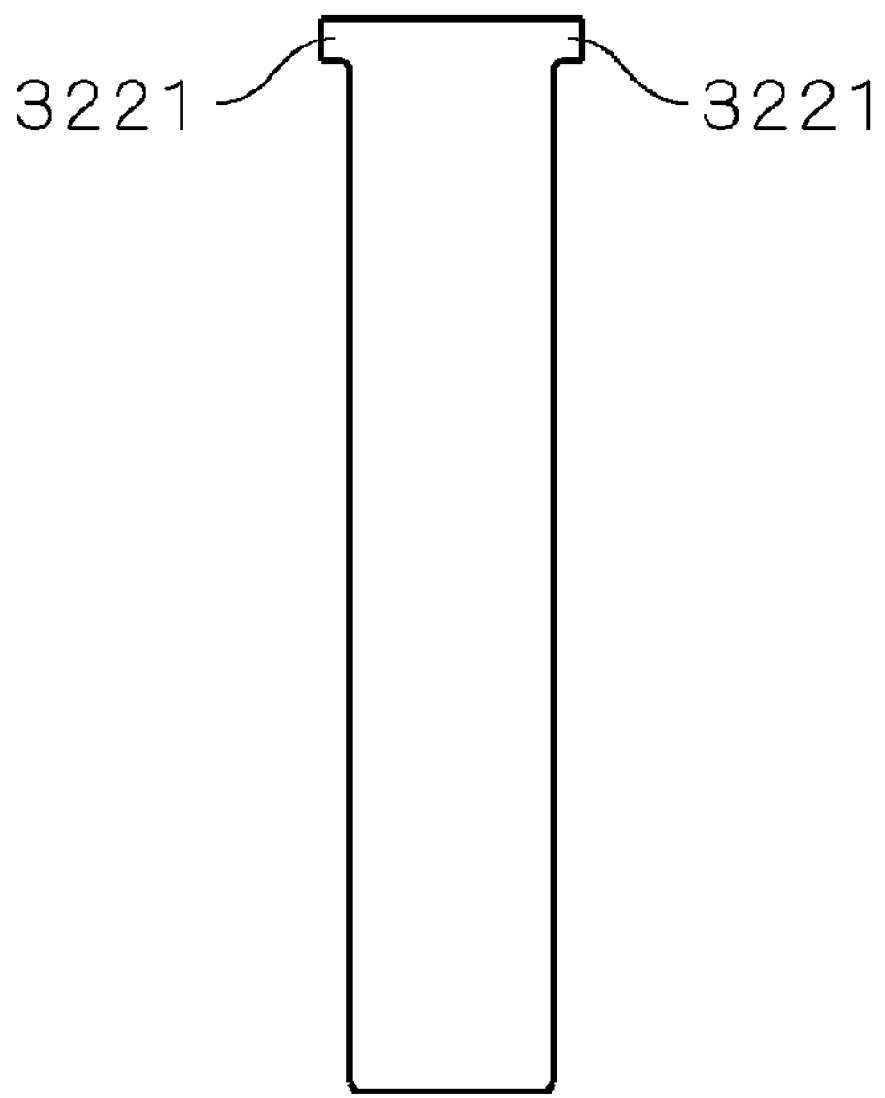
FIG. 9 is an elevational view depicting an outer-side insulator.

FIG. 9 is a front view of the outer-side insulator 322 disposed between the plural side portions 3213 of the tooth insulator 321. As indicated by the double-dot dash line in FIG. 4, the outer-side insulator 322 is attach to the outer side of the rim portions 3217 of adjacent side portions 3213, and is held between the rim portions 3217 and the inside surface of the support ring 33. Note that for brevity only one of the plural outer-side insulators 322 inserted between all of the side portions 3213 is shown in FIG. 4.

As shown in FIG. 9 the outer-side insulator 322 has a flange 3221 projecting to both sides perpendicularly to the length rendered at one lengthwise end (the top end when the outer-side insulator 322 is installed to the tooth insulator 321) of the outer-side insulator 322. When the outer-side insulator 322 is installed, the flange 3221 is held between the interlocking portion 3216 and rim portions 3217 of the tooth insulator 321, and the outer-side insulator 322 is held stationary with both long sides of the outer-side insulator 322 along the rim portions 3217. The length of the long side of the outer-side insulator 322 (the vertical sides as seen in FIG. 9) is equal to the length of the long side of the tooth insulator 321. As a result, the opening formed on the opposite side as the center axis J1 of the connecting portions 3214 when the top member 3211 and bottom member 3212 are mated is closed by the outer-side insulator 322 (see FIG. 4).

Figure 10:
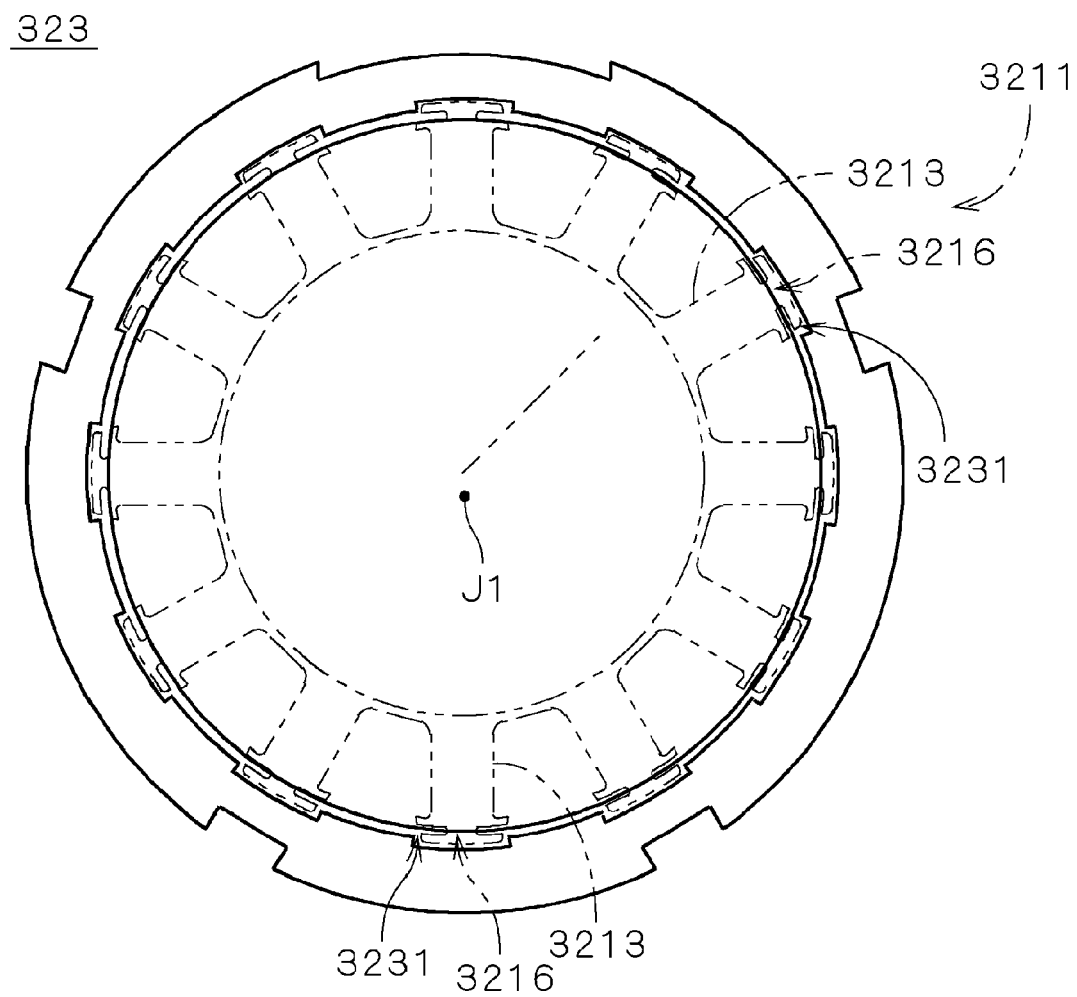
FIG. 10 is an underside view depicting an upper-end insulator.

FIG. 10 is a bottom view of the upper-end insulator 323 attached to the top of the tooth insulator 321. As shown in FIG. 10 this upper-end insulator 323 is a substantially annular thin plate with stepped recesses rendered in the bottom inside circumference portion. A plurality of recesses 3231 are additionally rendered in these stepped recesses. The end portions of the plural side portions 3213 of the top member 3211 indicated by the double-dot dash line in FIG. 10, that is, the outside surfaces of the interlocking portion 3216, are fit into these recesses 3231. Though not shown in the figures, the lower-end insulator attached to the bottom of the tooth insulator 321 is constructed identically to the upper-end insulator 323, and has a plurality of recesses into which the flanges 3216 of the bottom member 3212 fit. The upper-end insulator 323 covers the top surface of the support ring 33, which fits on a specific part on the top of the tooth insulator 321. The lower-end insulator 324 likewise covers the bottom surface of the support ring 33, which fits on a specific part on the bottom of the tooth insulator 321.

Assembly of all outer-side insulators 322 and the upper-end insulator 323 and lower-end insulator 324 to the tooth insulator 321 is described further in the following description of the armature 3 manufacturing process.

Figure 11:
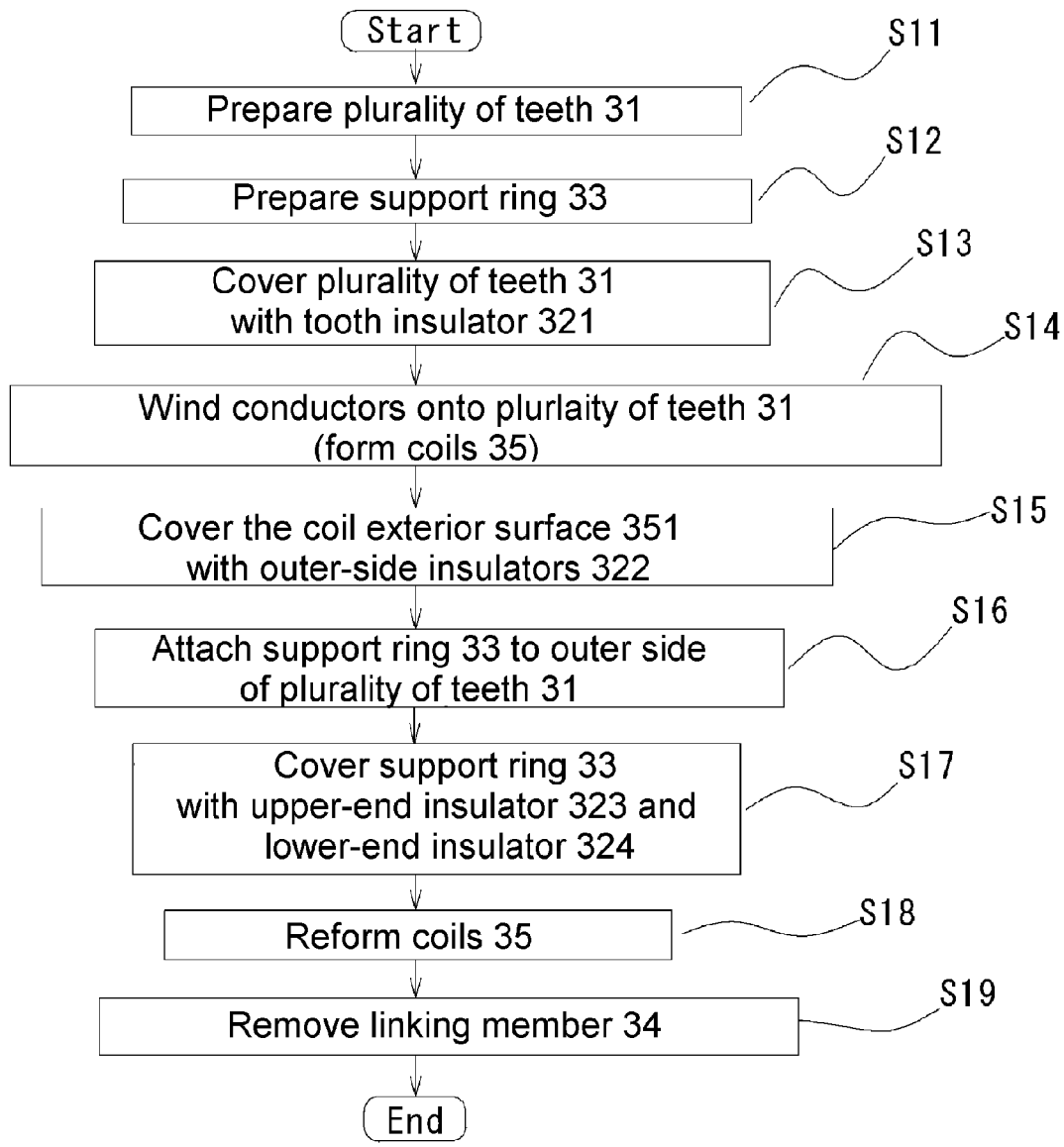
FIG. 11 is a flow chart outlining an armature manufacturing method.

FIG. 11 is a flow chart of the process for manufacturing an armature 3 for an electric motor 1 as described above. FIG. 12 to FIG. 20 show the armature 3 at different stages in the manufacturing process. FIG. 12 to FIG. 17 and FIG. 20 are plan views, and FIG. 18 and FIG. 19 are front views.

Figure 12:
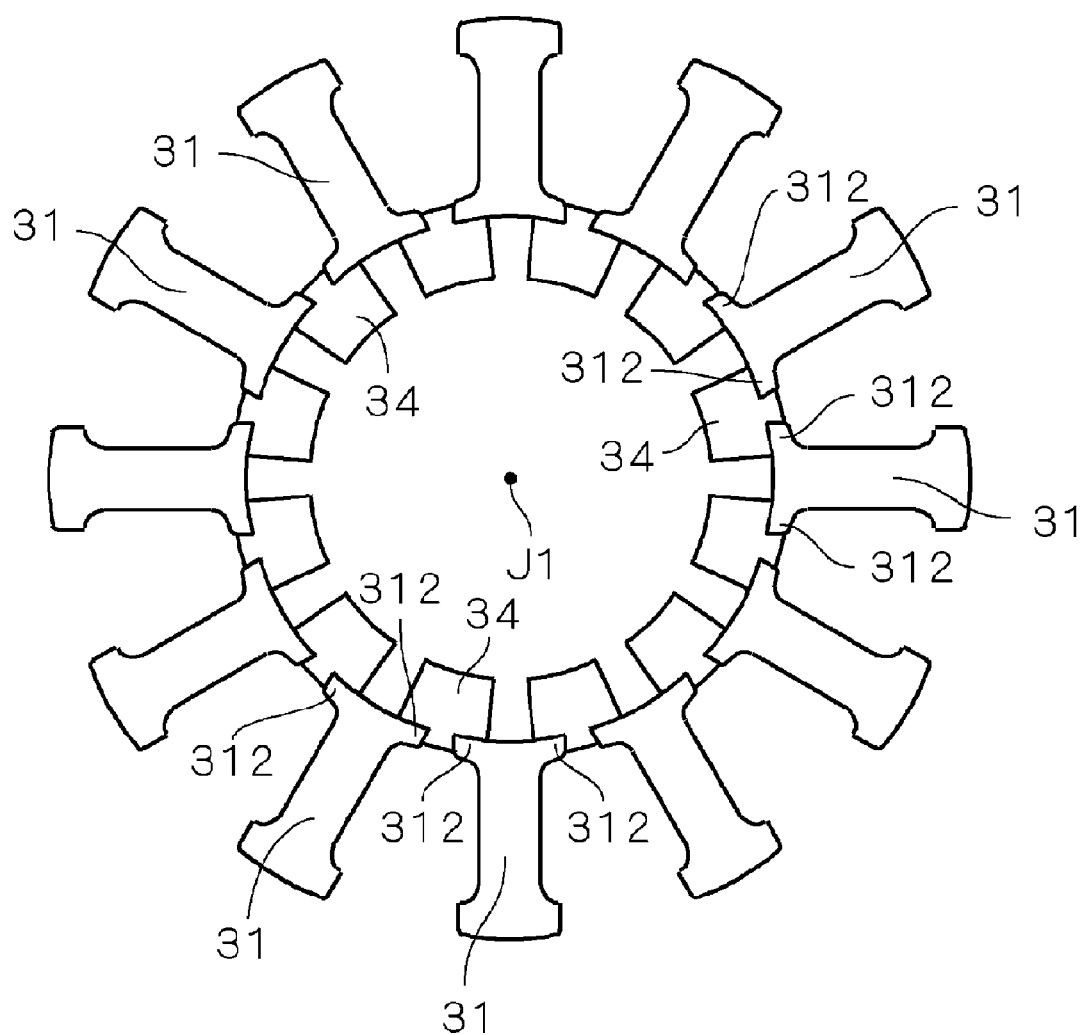
FIGS. 12-17 are plan views illustrating an armature.

As shown in FIG. 12, the first step in manufacturing an armature 3 is to arrange teeth 31 with the second protruding parts 312 on the inside (that is, toward the center axis J1) and the teeth 31 in a ring radiating from the center axis J1, and provisionally connect adjacent second protruding parts 312 by means of linking member 34 so that the plural teeth 31 are connected in unison (step S11). The teeth 31 and connecting members 34 are formed by stamping silicon steel plate to produce plural pieces. A specific number of these pieces are then laminated together. The pieces forming the linking member 34 are stamped from silicon steel together with the pieces forming the teeth 31, momentarily separated within the die from the teeth 31, and then once again fit together with the teeth 31.

Subsequently, silicon steel is die cut with a die for the support ring 33, and the support ring 33 is prepared by putting into form and laminating a plurality of the individual pieces that make up the support ring 33 (step S12). It will be appreciated that step S11 preparing the teeth 31 and step S12 preparing the support ring 33 could be parallel processes, or step S12 could precede step S11. Furthermore, the pieces forming the teeth 31 and linking member 34 and the pieces forming the support ring 33 could be stamped from a single sheet of silicon steel at the same time.

Figure 13:
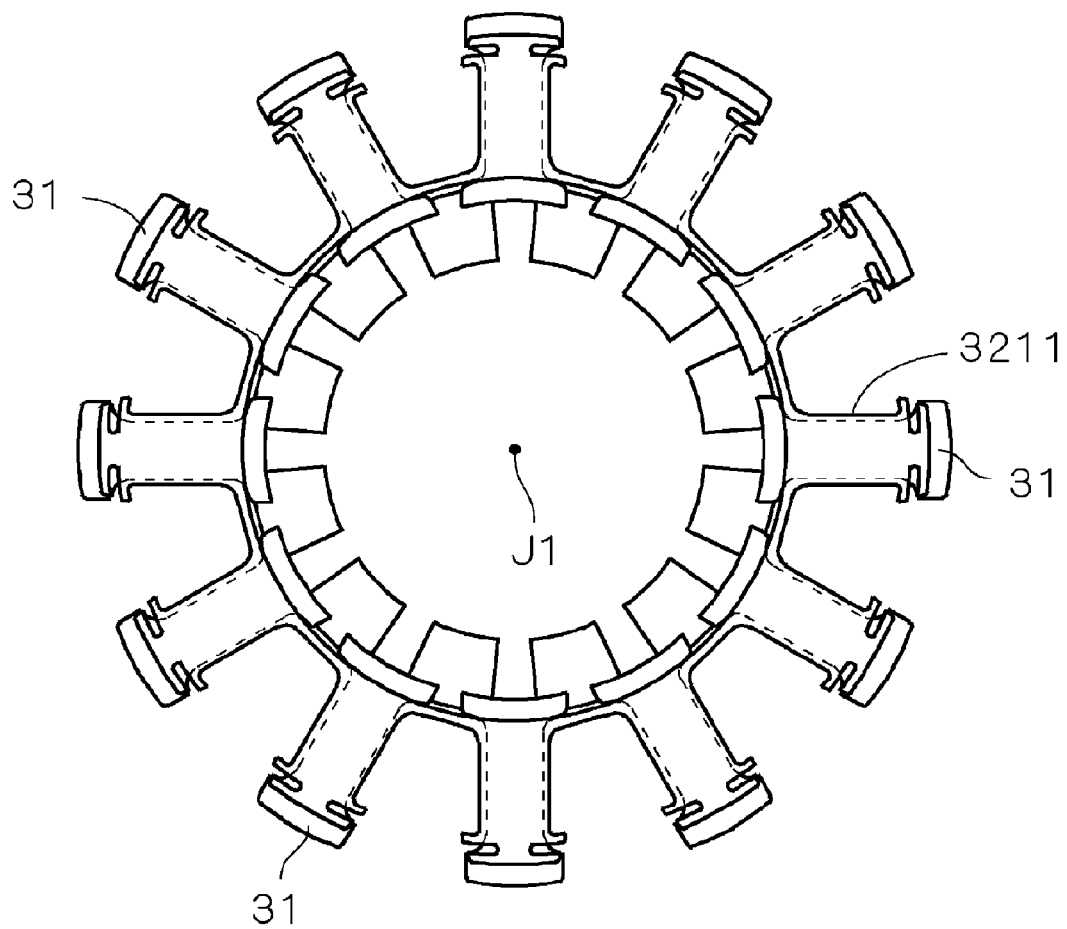

Once the teeth 31 and support ring 33 are prepared, the top member 3211 is assembled to the teeth 31 from above as shown in FIG. 13, thus covering the top half portion of the tooth lateral surfaces 313. The bottom member 3212 is also assembled to the bottom of the teeth 31, thus covering the bottom half portion of the tooth lateral surfaces 313. All lateral surfaces 313 of the plural teeth 31 are thus covered by the tooth insulator 321 (step S13). It will be readily apparent that the bottom member 3212 could be assembled to the teeth 31 first, or the top member 3211 and bottom member 3212 could be assembled to the teeth 31 at the same time.

Figure 14:
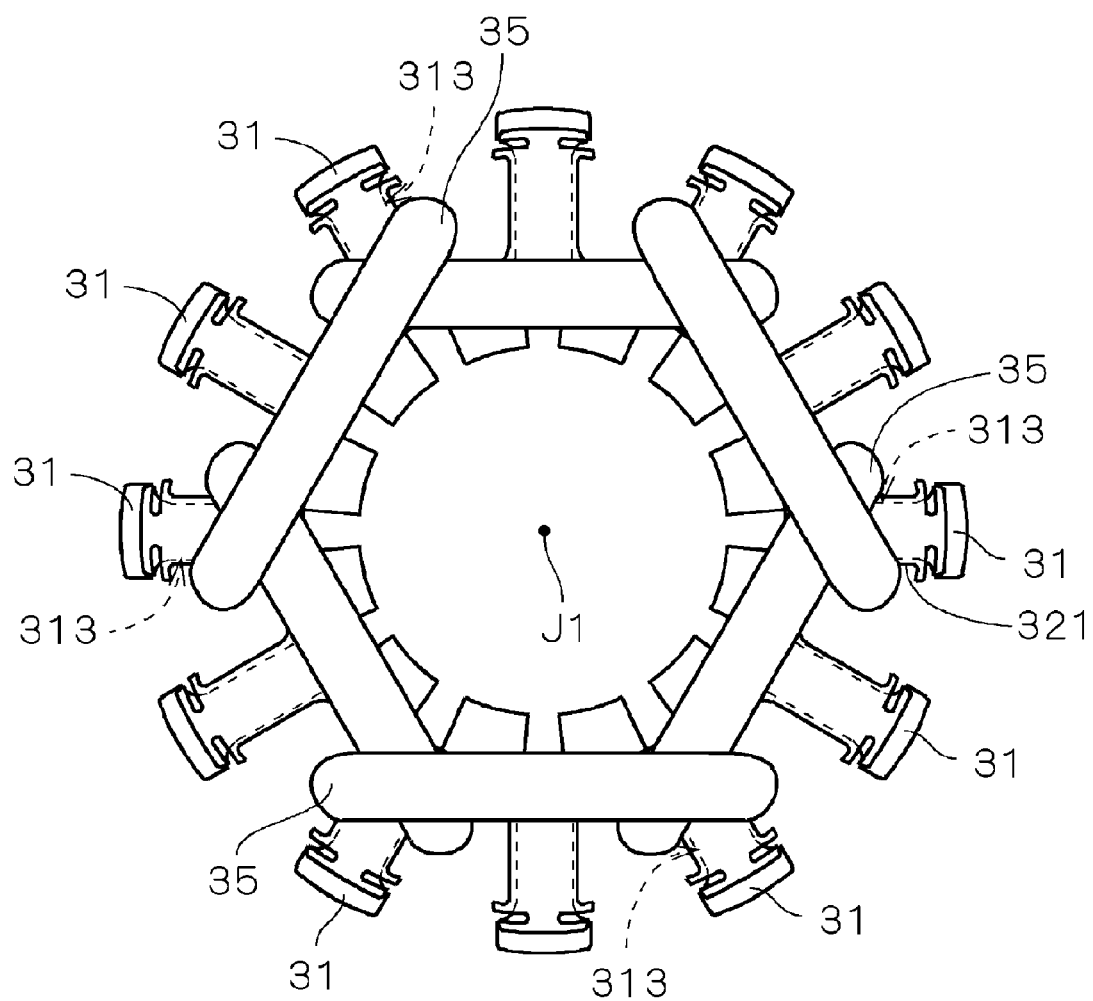

Once the tooth insulator 321 has been attached to the teeth 31, six conductors are wound onto the plural teeth 31 as shown in FIG. 14 with the tooth insulator 321 between the conductor and teeth 31, thus resulting in a plurality of coils 35 (six in this embodiment of the invention) (step S14). The coils 35 are formed as distributed windings in which the conductor is wound so as to straddle two or more of the plural teeth 31. In the present embodiment the conductor is wound so as to straddle three teeth 31. The coils 35 are thus electrically isolated by the tooth insulator 321 from all lateral surfaces 313 of the teeth 31. Because the coil 35 of this armature 3 is formed by winding the conductor from the outside of the teeth 31 where the gap between adjacent teeth 31 is wide, the conductor can be wound as easily as the armature of an outer rotor motor.

Figure 15:
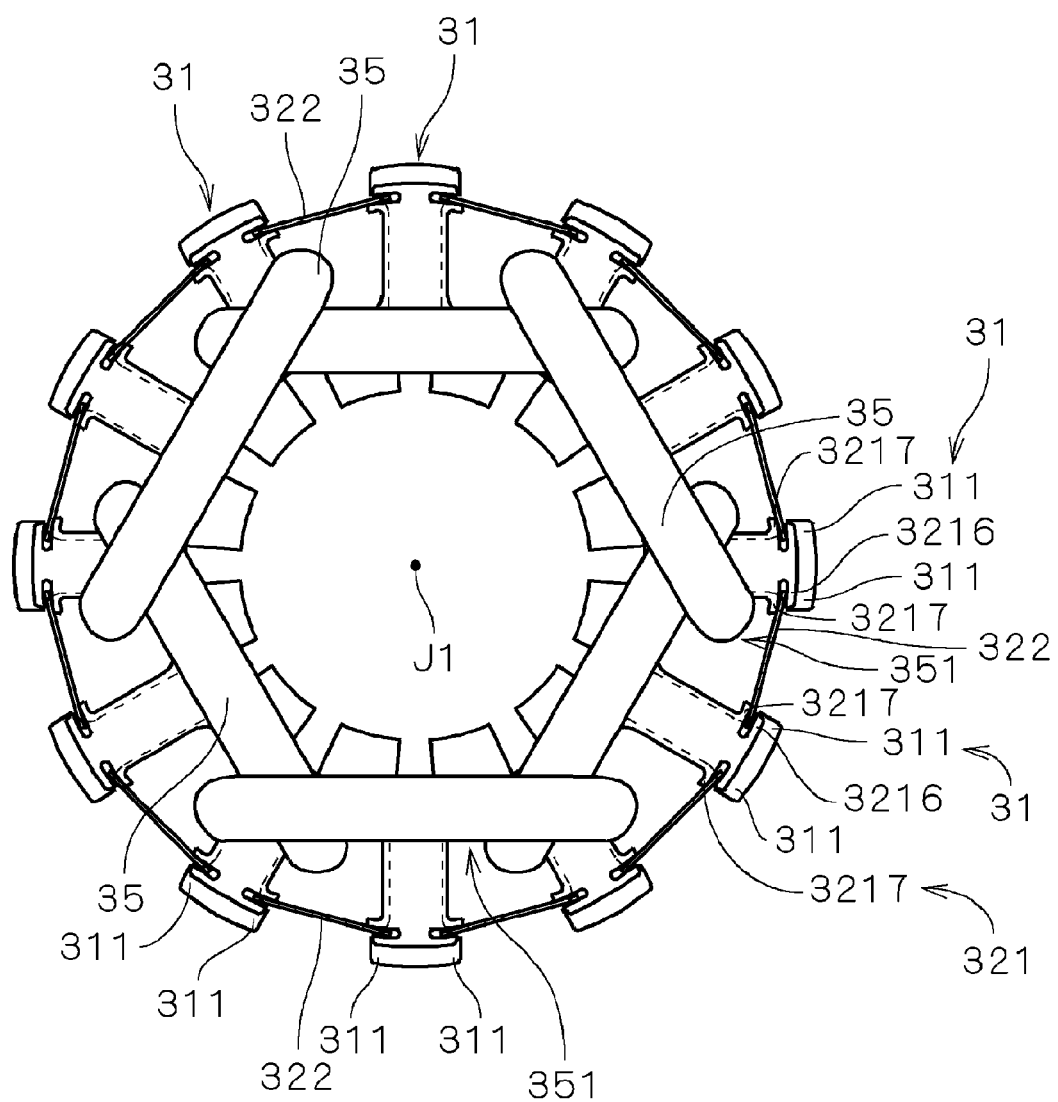

Once the coils 35 are wound, the outer-side insulators 322 are inserted parallel to the center axis J1 on the outside of the rim portions 3217 adjacent to the tooth insulator 321 and are thus affixed to the plural teeth 31 as shown in FIG. 15 covering the outside surface 351 (that is, the side of the coil 35 farthest removed from the center axis J1 between the teeth 31) of the coil 35 between adjacent teeth 31 (step S15). Each outer-side insulator 322 is held between the first protruding part 311 of the two adjacent teeth 31, and the two rim portions 3217 of the tooth insulators 321 rendered to the two teeth 31. As a result, the outer-side insulators 322 close the opening formed on the outside (that is, the side farthest from the center axis J1) between two adjacent teeth. The flanges 3221 formed on both sides of the outer-side insulator 322 (see FIG. 9) are also disposed between the interlocking portion 3216 and rim portions 3217 of the tooth insulator 321. The bottom of the flange 3221 simultaneously contacts the top of the teeth 31. As a result, the outer-side insulator 322 is held firmly in place.

Figure 16:
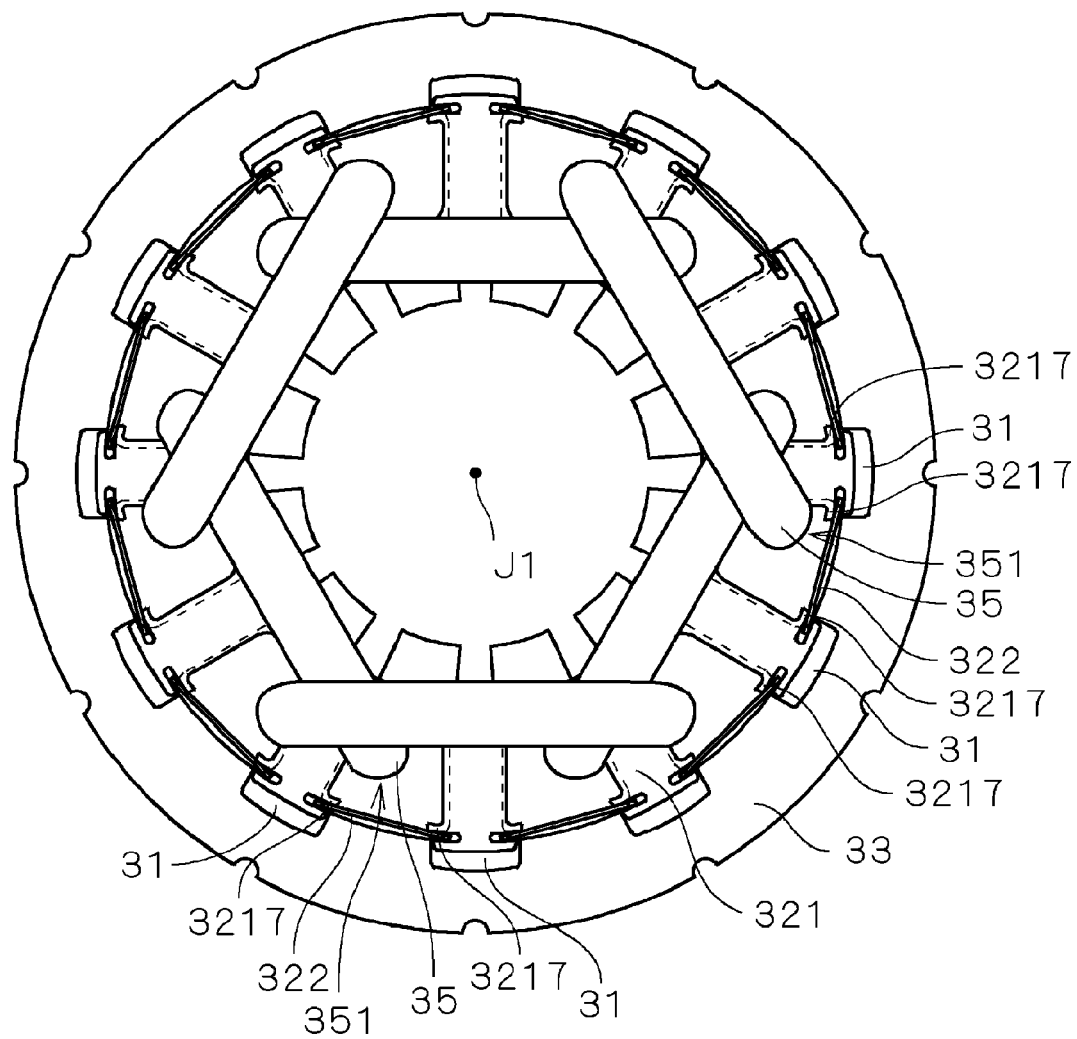

Once the outer-side insulators 322 are in place, the support ring 33 is assembled to the outside of the plural teeth 31 as shown in FIG. 16 (step S16). The inside surface of the support ring 33 is covered by the outer-side insulators 322 between the teeth 31. As a result, the outer-side insulator 322 reliably electrically isolates the outside surface 351 of the coil 35 and the support ring 33. The plural rim portions 3217 of the tooth insulator 321 also oppose the support ring 33 at the opposite end of the teeth 31 as the center axis J1 (that is, at the support ring 33 side of the teeth 31).

Figure 17:
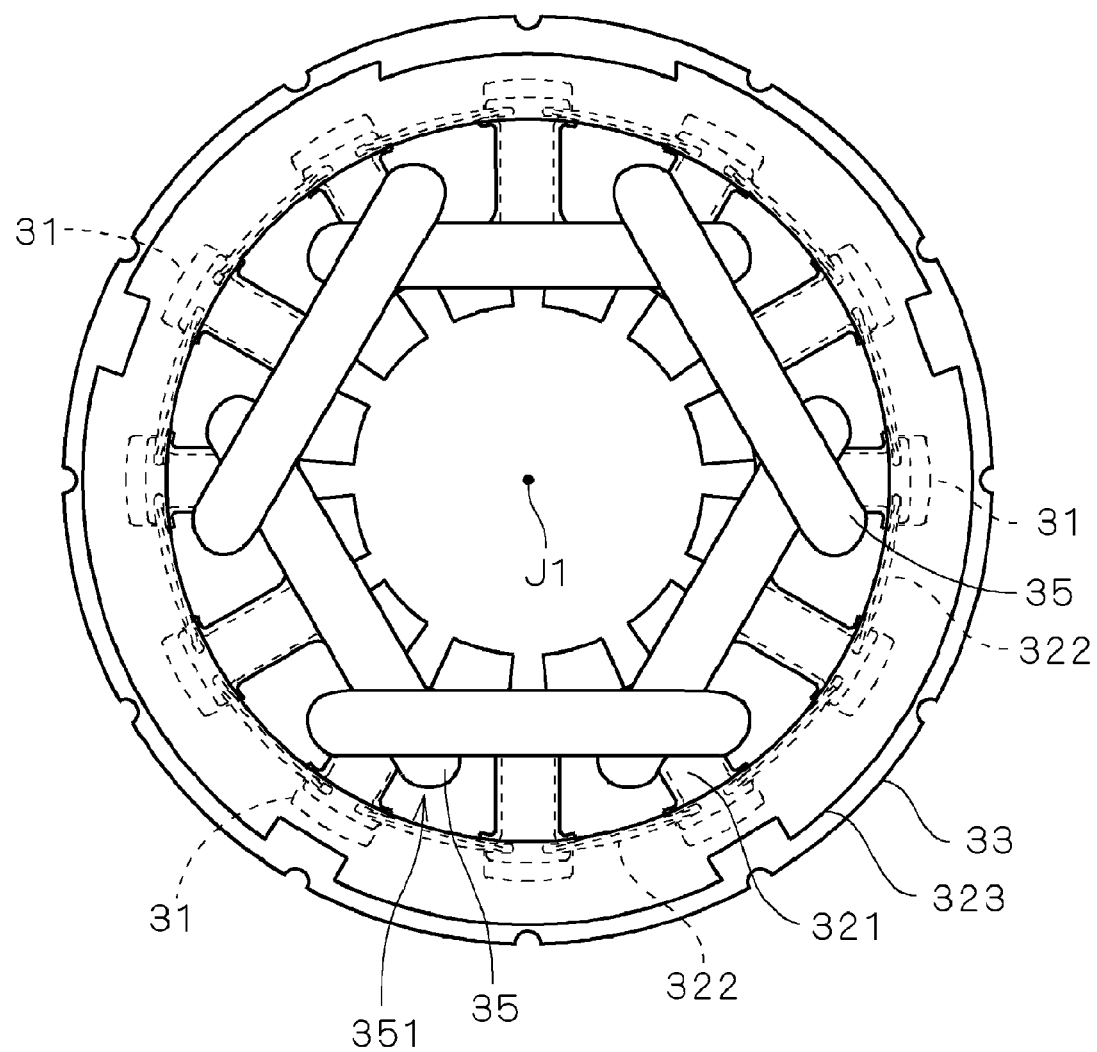
Figure 18:
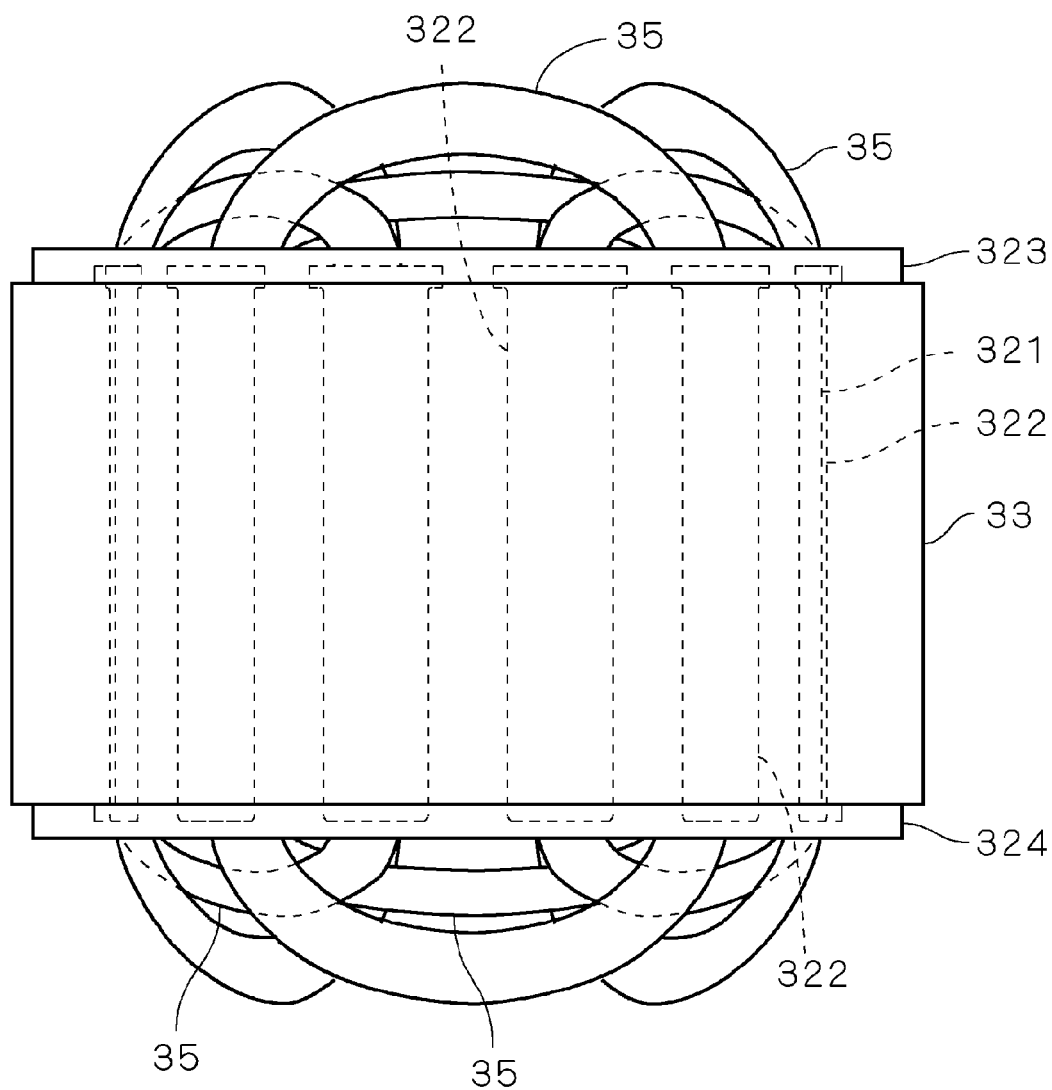
FIGS. 18 and 19 are elevational views representing the armature.
Figure 19:
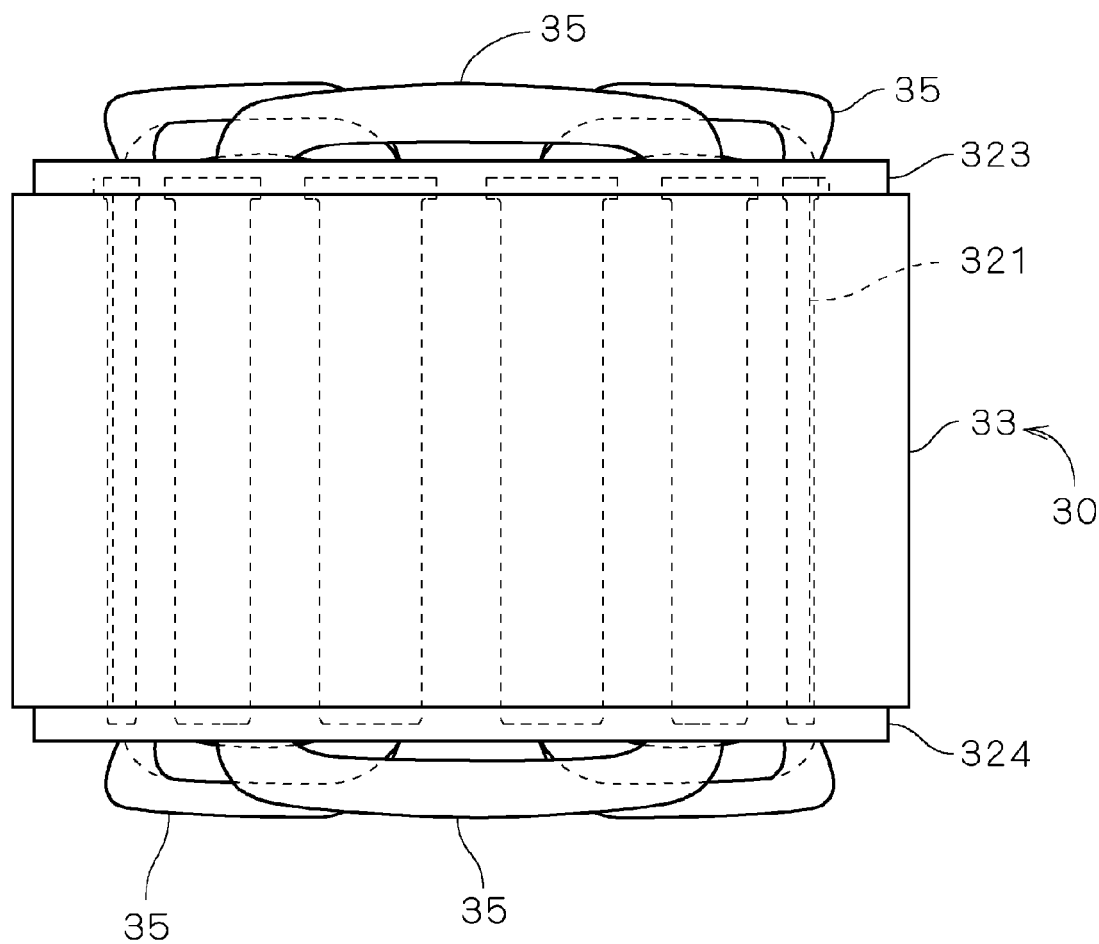

As shown in FIG. 17 and FIG. 18, the upper-end insulator 323 and lower-end insulator 324 are then assembled to the top and bottom sides of the support ring 33 (see FIG. 18), thus covering the top and bottom surfaces of the support ring 33 (step S17). As shown in FIG. 17 and FIG. 18, the top and bottom end parts of the plural outer-side insulators 322 fit into the recesses 3231 in the upper-end insulator 323 and lower-end insulator 324 (see FIG. 10). This arrangement renders the plural outer-side insulators 322 between the upper-end insulator 323 above and the lower-end insulator 324 below, and easily and reliably fixes the outer-side insulators 322 between the tooth insulator 321 and support ring 33. The armature 3 resulting from step S17 has the coils 35 protruding greatly above the upper-end insulator 323 and below the lower-end insulator 324 because a large diameter conductor that is difficult to bend is wound around a plurality of teeth 31.

Figure 20:
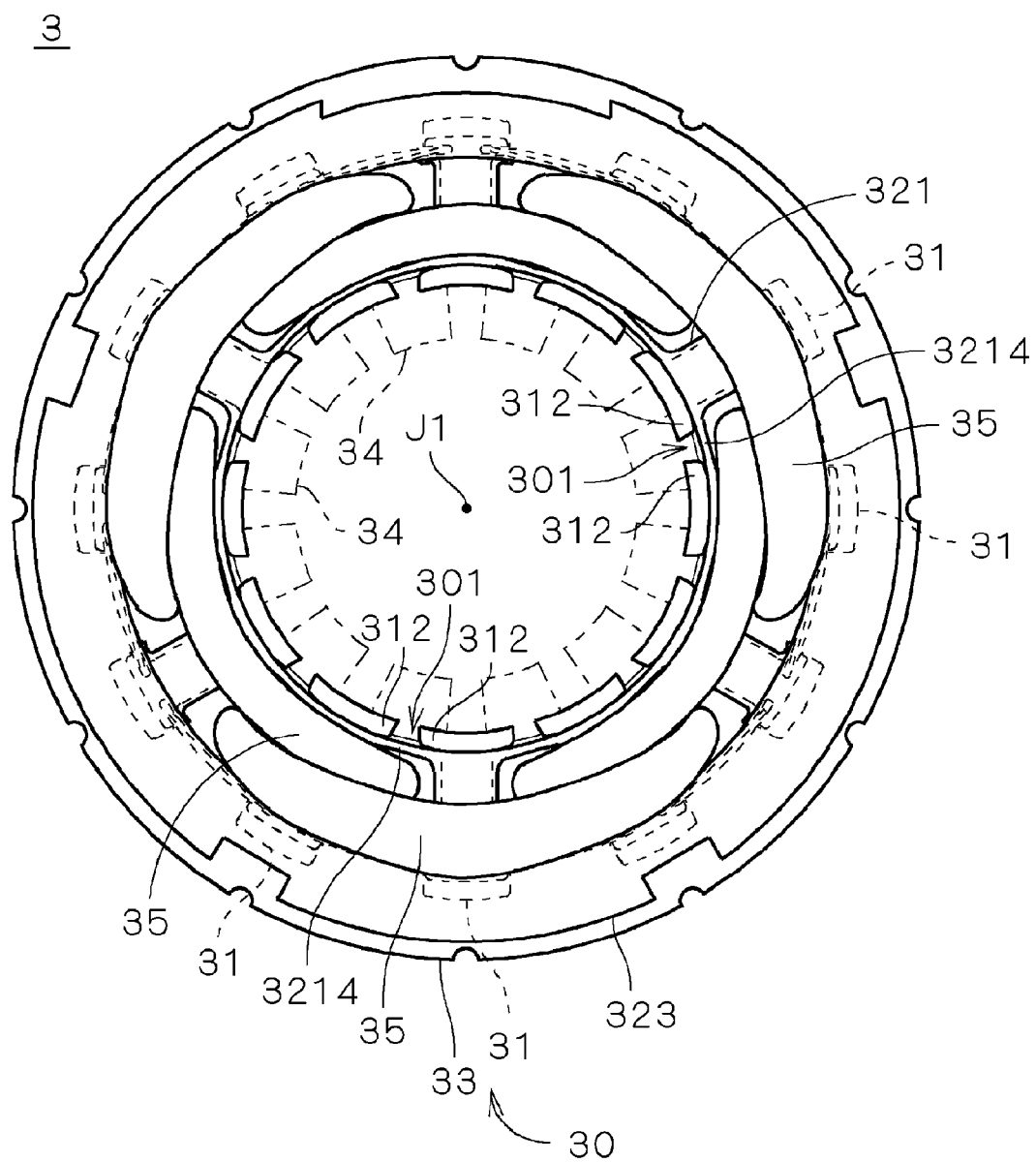
FIG. 20 is a plan view depicting the armature.

After the upper-end insulator 323 and lower-end insulator 324 are thus assembled, the top and bottom portions of the coils 35 protruding above and below the teeth 31 and support ring 33 (that is, the core 30) are reformed as shown in FIG. 19 and FIG. 20 by pressing the exposed portions of the coil to the outside away from the center axis J1 (see FIG. 20) and to the top and bottom surface of the core 30 (that is, the top and bottom of the tooth insulator 321, as well as the upper-end insulator 323 and lower-end insulator 324) (step S18). This reduces protrusion of the coils 35 from the core 30. The tops and bottoms of the coils 35 also move from the top or bottom of the teeth 31 shown in FIG. 17 to the support ring 33 side shown in FIG. 20. Reforming the coils 35 in this armature 3 renders the coils 35 close to the top and bottom surfaces of the support ring 33, but the upper-end insulator 323 and lower-end insulator 324 prevent the reformed coils 35 from directly contacting the top and bottom surfaces of the support ring 33.

The linking member 34 temporarily joining the second protruding parts 312 of the plural teeth 31 (denoted by the double-dot dash line in FIG. 20) is then removed, thus releasing the provisionally connected plural teeth 31 and completing manufacture of the armature 3 (step S19). The linking member 34 can be easily removed from the armature 3 because the linking member 34 was first completely separated from the teeth 31 and then fit back thereto. As shown in FIG. 20, the open slots 301 that are the gaps between the ends of the plural teeth 31 on the center axis J1 side are closed by the connecting portions 3214 of the tooth insulator 321. Note that because the teeth 31 are held by the support ring 33, the teeth 31 will not fall out of place when the linking member 34 is removed.

As described above, the armature 3 of an electric motor 1 according to the present invention has a plurality of coils 35 formed by winding a conductor around the outside of teeth 31, outer-side insulators 322 rendered between the coils 35 and a support ring 33 which is attached after the coils 35 are formed, and these outer-side insulators 322 prevent direct contact between the outside surfaces 351 of the coils 35 and the inside surface of the support ring 33.

Furthermore, a tooth insulator 321, which is composed of substantially annular top and bottom members 3211, 3212 assembled to the teeth 31 from above and below, covers the lateral surfaces 313 of the teeth 31 and thus prevents contact between the coils 35 and teeth 31. The coils 35 and core 30 can thus be easily and reliably electrically isolated in an inner-rotor motor 1. Note that an insulator covering other portions of the core 30 can also be provided.

The coils 35 in the armature 3 of the present invention are made with a distributed winding and the coils 35 thus protrude more above and below the core 30 than if the coils 35 were made using a concentrated winding wrapping a conductor to each individual tooth 31. The coils 35 are then deformed greatly to the outside (that is, toward the support ring 33) in the reforming process. However, contact between the coils 35 and the top and bottom surfaces of the support ring 33 is prevented when the top and bottom portions of the coils 35 protruding from the core 30 are reformed because the top and bottom of the support ring 33 are protected by upper-end insulator 323 and lower-end insulator 324 in the armature 3 of the present invention, and the coils 35 and the core 30 are thus reliably isolated.

This structure of an armature 3 having the top and bottom surfaces of the support ring 33 covered by upper-end insulator 323 and lower-end insulator 324 is particularly well suited to a motor 1 having coils 35 formed with a distributed winding.

The tooth insulator 321 in this armature 3 is separated into a top member 3211 and a bottom member 3212 which are affixed from opposite sides to the plural teeth 31, thus making it simple to assemble the tooth insulator 321 to the teeth 31. The manufacturing cost is also reduced and the manufacturing process simplified as a result of the top member 3211 and bottom member 3212 having the same shape.

Foreign matter (such as pieces of conductor and varnish) is also prevented from passing from the stator 3a side to the rotor 2a side through the open slots 301 as a result of the connecting portions 3214 of the tooth insulator 321 occluding the open slots 301.

Yet further, the teeth 31 can be easily and completely covered without exposing any portion of the teeth 31 because the tapered faces 3218a, 3218b of the top member 3211 and bottom member 3212 overlap. The edges of the tapered faces 3218a, 3218b are also not exposed to the lateral surfaces 313 of the teeth and thus will not damage the conductor.

Both side edges of the outer-side insulator 322 are held between the first protruding parts 311 of two adjacent teeth 31 and two rim portions 3217 of the tooth insulator 321, and the outer-side insulator 322 in this armature 3 can thus be held by a simple structure. Furthermore, by assembling the outer-side insulator 322 to the teeth 31 before the support ring 33 is attached, the outer-side insulator 322 can be installed more easily than if the outer-side insulator 322 were inserted between the coils 35 and support ring 33 after the support ring 33 is attached. In addition, the upper-end insulator 323 and lower-end insulator 324 can be easily installed without interference from the coils 35 because the upper-end insulator 323 and lower-end insulator 324 are attached to the teeth 31 after the support ring 33 is in place, and the top and bottom parts of the coils 35 are then reformed.

The present invention is described above with reference to a preferred embodiment of the invention, but the invention shall not be limited to the foregoing embodiment and can be varied in many ways.

For example, the coils 35 could be formed with a concentrated winding depending upon the drive method of the motor 1. This results in less protrusion of the coils 35 above and below the core 30 than results from a distributed winding, and may therefore enable eliminating reforming the top and bottom parts of the coils 35. It may also be possible to eliminate the upper-end insulator 323 and lower-end insulator 324 in such an arrangement.

The top member 3211 and bottom member 3212 of the tooth insulator 321 are also not necessarily identically shaped.

The open slots 301 are preferably occluded in order to prevent foreign matter from entering to the rotor 2a. However, depending upon the size of the armature 3 and the shape of the teeth 31, an opening could be present in the connecting portions 3214 of the tooth insulator 321 occluding the open slots 301.

Furthermore, in order simplify holding and securing the outer-side insulator 322, the outer-side insulator 322 is preferably installed using the structure and method described in the foregoing embodiment of the invention. However, the outer-side insulator 322 could be held by a different structure determined by the configuration of the coils 35 and teeth 31. For example, the outer-side insulator 322 could be installed to the teeth 31 by inserting both side edges of the outer-side insulator 322 to grooves formed in the opposing side surfaces 313 of any two adjacent teeth 31. In this arrangement the top and bottom edge parts of the outer-side insulator 322 do not oppose the upper-end insulator 323 and lower-end insulator 324 and can be fixed to the teeth 31 by another method as required.

When manufacturing the armature 3 of the present invention the upper-end insulator 323 and lower-end insulator 324 could be assembled and the top and bottom portions of the coils 35 could be reformed after the support ring 33 is affixed to the plural teeth 31 and the linking member 34 is removed.

A motor 1 according to the present invention can be used, for example, in electrically-assisted power steering systems, electronic brake systems, electromagnetic suspension systems, and transmission systems in motor vehicles, in systems assisting operation and control of non-automotive vehicles such as trains, and other applications in industry, the home, and office automation.

The outer-side insulator in the foregoing embodiment of the invention is composed of multiple parts, but the invention shall not be so limited to a specific number. More particularly, two or more outer-side insulators, or a seamless unitary outer-side insulator made by bonding a plurality of outer-side insulators, could be used.

What is claimed is:

1. A method of manufacturing an inner-rotor armature, the method comprising:
   (a) a step of preparing a plurality of teeth disposed with the teeth fore edges directed toward a predetermined center axis, arranged in a radial pattern with the center axis as the center of the radial pattern, and arranged such that the teeth fore edges are temporarily joined together by a linking member;
   (b) a step of attaching a tooth insulator to the lateral sides of the plurality of teeth, wherein said step (b) of attaching a tooth insulator includes:
      a step of attaching a top member of the tooth insulator to the plurality of teeth over their upper end in an orientation substantially paralleling the center axis; and
      a step of attaching a bottom member of the tooth insulator to the plurality of teeth over their lower end in the orientation substantially paralleling the center axis;
   (c) a step of forming coils by winding conductors over the tooth insulator and around the plurality of teeth;
   (d) a step of installing a plurality of outer-side insulators in an interdigitated fashion between adjacent ones of the plurality of teeth for covering the exterior side of the coils between adjacent ones of the plurality of teeth, wherein each of the plurality of outer-side insulators is held between the adjacent ones of the plurality of teeth by opposing rim portions located in the top and bottom members of the tooth insulator;
   (e) a step of attaching a support ring to the plurality of teeth for supporting the plurality of teeth along their outer side; and
   (f) a step of removing the linking member linking the teeth fore edges of the plurality of teeth.

2. An armature manufacturing method as set forth in claim 1, wherein in said step (c) the coils are formed by distributed winding in which the conductors are wound on straddling two or more teeth among the plurality of teeth.

3. An armature manufacturing method as set forth in claim 2, further comprising:
   a step, subsequent to said step (e), of attaching annular upper-end and lower-end insulators to the top and bottom sides of the support ring; and
   a step of reforming the upper and lower portions of the coils.

4. An armature manufacturing method as set forth in claim 3, wherein the upper and lower end portions of the plurality of outer-side insulators respectively oppose the upper-end and lower-end insulators.

5. An armature manufacturing method as set forth in claim 1, wherein the interspaces between the teeth fore edges of the plurality of teeth are closed off by the tooth insulator.

6. An armature manufacturing method as set forth in claim 1, wherein in said step (c), the conductor with which winding is begun among the conductors is wound on from the outer side of the plurality of teeth, heading toward the center axis.

* * * * *